United States Patent
Kredo et al.

(10) Patent No.: US 6,816,578 B1
(45) Date of Patent: Nov. 9, 2004

(54) EFFICIENT INSTANT MESSAGING USING A TELEPHONY INTERFACE

(75) Inventors: Thomas J. Kredo, Rochester, NY (US); Margaret Avino, Pittsford, NY (US); Richard Bergman, Williamson, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/995,113

(22) Filed: Nov. 27, 2001

(51) Int. Cl.[7] .............................................. H04M 1/64
(52) U.S. Cl. ...................................... 379/88.17; 704/4
(58) Field of Search ........................ 379/88.17, 88.13, 379/88.18, 88.01, 88.02, 88.04; 704/1, 2, 3, 270.1, 4; 709/204, 207, 203, 217, 218, 219

(56) References Cited

U.S. PATENT DOCUMENTS

| | | | |
|---|---|---|---|
| 6,173,250 B1 * | 1/2001 | Jong .............................. | 704/3 |
| 6,173,262 B1 * | 1/2001 | Hirschberg .................. | 704/260 |
| 6,356,937 B1 * | 3/2002 | Montville et al. .......... | 709/206 |
| 6,366,886 B1 * | 4/2002 | Dragosh et al. ......... | 704/270.1 |
| 6,385,461 B1 * | 5/2002 | Raith .......................... | 455/518 |
| 6,389,114 B1 * | 5/2002 | Dowens et al. .............. | 379/52 |
| 6,430,604 B1 * | 8/2002 | Ogle et al. .................. | 709/207 |
| 6,484,196 B1 * | 11/2002 | Maurille ..................... | 709/206 |
| 6,507,643 B1 * | 1/2003 | Groner .................... | 379/88.14 |
| 6,618,704 B2 * | 9/2003 | Kanevsky et al. .......... | 704/271 |

* cited by examiner

*Primary Examiner*—Fan Tsang
*Assistant Examiner*—Ming Chow
(74) *Attorney, Agent, or Firm*—Withrow & Terranova, PLLC (57) ABSTRACT

The present invention allows telephony users and on line users to communicate with one another using an instant massaging (AIM) service. The on line IM user will provide and receive textual messages, wherein the telephony user will provide and receive corresponding audible messages. To allow more efficient interaction with the telephony user, responses to queries posed to the telephony user are structured with possible answers. The answers are used to define and limit the voice recognition grammar for processing the telephony user's response. Predefining the grammar for responses increases the effectiveness of the speech recognition system and the integrity of the IM session. Further, voice commands may be predefined to facilitate better control of the IM session as well as provide more effective communications.

29 Claims, 11 Drawing Sheets

SYSTEM COMMANDS

| Phrase | Action | Text Sent To PC User |
|---|---|---|
| Help | Send HELP Screen to PC User | "I have a limited vocabulary and I can respond to your question. Please end your question with a "?" You can program my responses by providing me with several choices after your "?". For example "HI. Want to go with me to ? The river ? The church ?" |
| Bye | End Session | "Bye" |
| Record | Prompts caller to record message. Message Stored on Server. URL Sent to PC User. | "I have just recorded a message for you www.myvoice/me/123" |
| Identify | Identifies current PC user and status to the caller: "USER A is talking to Wizzywig" | N/A |
| Transcript | Server will start to make a history file of the entire text transaction. When the session completed, it will send the transcript to the caller's E-mail Account on record. | N/A |
| Notify | Allows the cell phone user to hang up, and receive notifications via SMS on buddy messages and buddy login. User remains logged into the IM service. | "USER A stepped away for minute. I'll go fetch him" |
| Vcard | Sends the Profile defined Vcard information to the PC User. | "USER A. 8574 Main Street, Rochester,NY 14610. 716-232-2312(h), 716-343-3244(w)." |

FIG.4

CONVERSATION VOCABULARY

| Phrase | Action | Text Sent |
|---|---|---|
| Yes | | "Yes" |
| No | | "No" |
| Maybe | | "Maybe" |
| Money | Reprompt for Money using Money Grammar. | "$53.23" |
| Digits | Reprompt for Digits using Digits Grammar. | "10223" |
| Number | Reprompt for Number using Number Grammar. | "10,223" |
| Time | Reprompt for Time using Time Grammar. | "5:45 AM" |
| Date | Reprompt for Date using Date Grammar. | "January 2, 2002" |
| Clarify | | "Clarify" |
| Who | | "Who" |
| What | | "What" |
| When | | "When" |
| Where | | "Where" |
| Why | | "Why" |
| Smile | | ":)" |
| Phone | | "716-482-5000" |

EFFICIENT INSTANT MESSAGING USING A TELEPHONY INTERFACE

FIELD OF THE INVENTION

The present invention relates to facilitating communications between a telephony user and an on line user, and in particular, relates to facilitating instant messaging between these users.

BACKGROUND OF THE INVENTION

The rapid acceptance of the Internet has changed the way in which people communicate. A significant number of letters and telephone calls have been replaced with email messages. Although email is an effective communication medium, ongoing on line communications are often hampered because of the extra steps necessary to view, reply, and send email messages. Further, email provides no way of knowing if the person with whom someone is communicating is on line at that particular moment. With these deficiencies, instant messaging (IM) has gained great popularity over email to facilitate immediate and ongoing on line communications.

Typically, IM allows users to form a list of people with whom they wish to communicate. This list is typically called a "buddy list," and most IM services allow users to communicate with anyone on their buddy list, assuming that the person is on line at that given time. Generally, users will send an alert to those persons on their buddy-list who are on line prior to engaging in a conversation. Most IM services provide a small text window where two or more users can type messages that both users can instantly view. IM services not only allow users to send notes back and forth while on line, they can also allow users to set up chat rooms to communicate with groups of users, and to share links to web sites as well as images, audio, and the like.

Given the-wide acceptance of IM, there is a need to support IM between traditional on line users and traditional land-based or wireless telephony users, who are restricted to using voice to send messages and to receiving audible messages. For conciseness and readability "on line user" is used to refer to traditional on line users that interact with IM services through a personal computer or like text-based device.

SUMMARY OF THE INVENTION

The present invention allows telephony users and on line users to communicate with one another using an instant messaging (IM) service. The on line IM user will provide and receive textual messages, wherein the telephony user will provide and receive corresponding audible messages. To allow more efficient interaction with the telephony user, responses to queries posed to the telephony user are structured with possible answers. The answers are used to define and limit the voice recognition grammar for processing the telephony user's response. Predefining the grammar for responses increases the effectiveness of the speech recognition system and the integrity of the IM session. Further, voice commands may be predefined to facilitate better control of the IM session as well as provide more effective communications.

In one configuration, an IM proxy server is used to act as a liaison between a traditional IM service supported through an IM proxy server and the telephony user. In essence, the IM server effectively treats the IM proxy server as a second on line user. The IM proxy server interacts with an audio browser to communicate with the telephony user via a telephone network and act as a proxy on behalf of the telephony user for the IM server.

The audio browser effectively translates speech-to-text for messages directed to the on line IM user and translates text-to-speech for messages received from the on line -user and directed to the telephony user. The IM proxy server interacts with the audio browser to receive text converted from audio from the telephony user and provides an equivalent instant message to the IM server for delivery to the on line IM user.

Similarly, messages directed to the telephony user via a mobile terminal or the like and received by the IM server from the on line IM user are forwarded to the IM proxy server. The IM proxy server will process the message to form a text-based message ready for conversion to an audio format. The processed message is sent to the audio browser, which converts the message to an audio format and delivers it to the mobile terminal; As such, the audio browser provides text-to-speech and speech-to-text conversion to facilitate communications between the IM proxy server and the mobile terminal. The IM proxy server translates text messages to and from other text messages in a manner consistent with instant messaging.

In operation; the audio browser will receive a message and convert audible commands within the message for processing by the IM proxy server. The IM proxy server will receive the command derived from the audio message and create an instant message based on the message meaning and any associated characteristics. The instant message is then delivered to the on line IM user via the IM server.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention allows telephony users and on line users to communicate with one another using an instant messaging (IM) service. The on line user will provide and receive textual messages, wherein the telephony user will provide and receive corresponding audible messages. The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
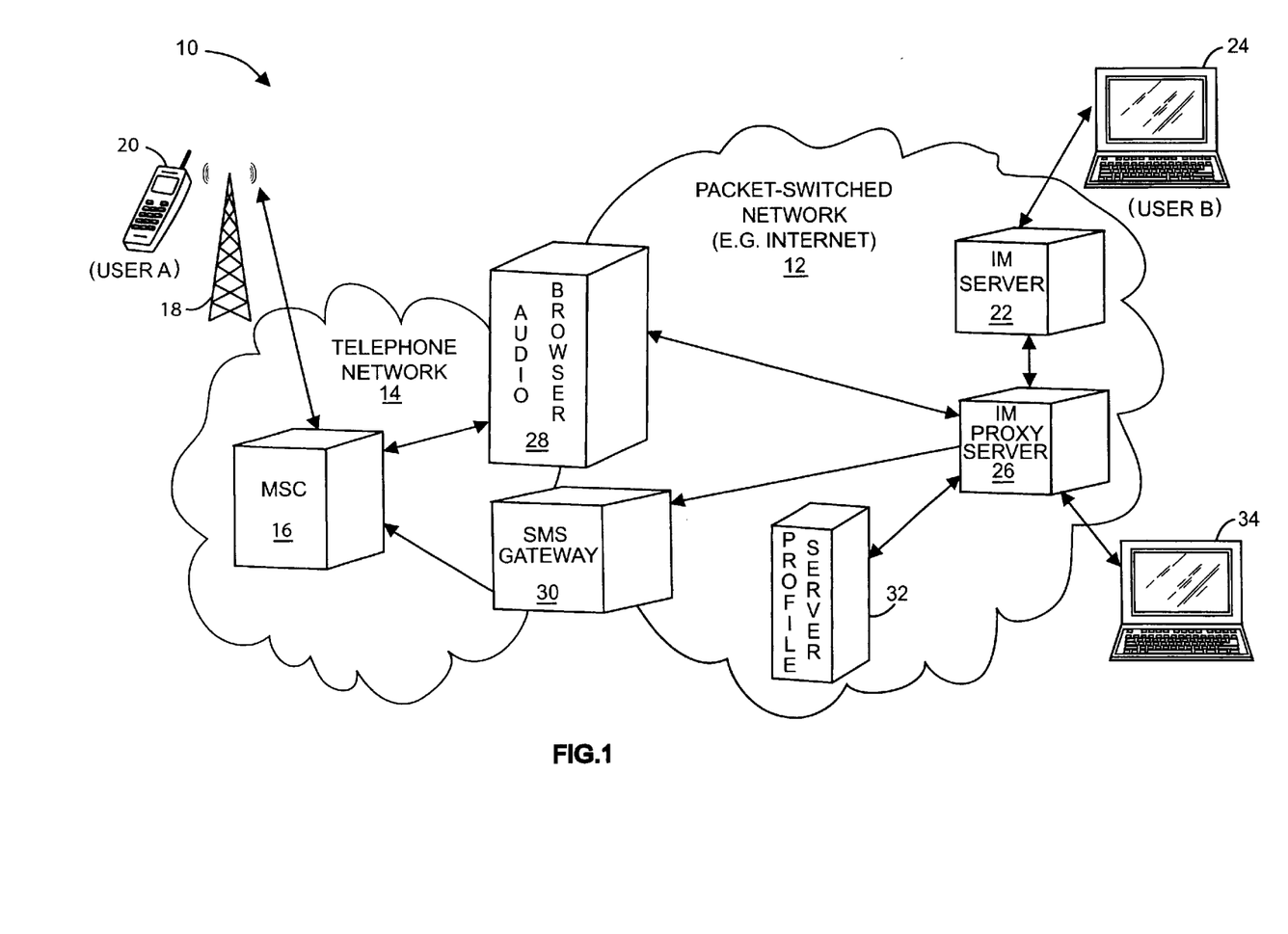
FIG. 1 depicts a communication environment sufficient to support a preferred embodiment of the present invention.

Turning now to FIG. 1, an exemplary communication environment 10 is illustrated. The communication environment 10 will include a packet-switched network 12, such as the Internet, and a circuit-switched telephone network 14, such as the public switched telephone network (PSTN), wireless telephone network, or combination thereof. For the purposes of describing the preferred embodiments of the present invention, a wireless telephone network 14 is described. Those skilled in the art will recognize the applicability of the present invention to land-based telephony communications in addition to mobile communications.

Assuming that the circuit-switched telephone network 14 is capable of facilitating mobile communications, a mobile switching center (MSC) 16 will typically communicate with base station 18. The base station 18 will support wireless communications with a mobile terminal 20, such as a mobile telephone or personal digital assistant (PDA).

In the packet-switched network 12, IM server 22 provides IM services. Traditionally, the IM server 22 processes messages sent between users. For example, a text-based user B will use a computer 24 to generate and send instant messages for delivery to another user to the IM server 22. The IM server 22 will facilitate the delivery of the message to the other user for viewing. Similarly, messages directed to user B are sent to the IM server 22 and forwarded to user B's computer 24.

With the-present invention, a telephony user A is allowed N participate in an IM session without negatively impacting or causing the need for modification in the IM functions provided by the IM server 22. Typically, an IM proxy server 26 acts as a liaison between the IM server 22 and the telephony user A. In essence, the IM server 22 will effectively treat the IM proxy server 26 as the telephony user A. The IM proxy server 26 interacts with an audio browser 28 to communicate with the telephony user A through telephone network 14 and act as a proxy for the IM server 22 on behalf of the telephony user A. As will be discussed in greater detail below, the audio browser 28 effectively translates speech-to-text for incoming messages from the telephony user A and translates text-to-speech for messages directed to the telephony user A.

The IM proxy server 26 interacts with the audio browser 28 to receive text converted from audio from the telephony user A and provide equivalent instant messages to the IM server 22 for delivery to the computer 24 of user B. Similarly, messages directed to the mobile terminal 20 and received by telephony user A from the computer 24 of user B are sent to the IM server 22 and forwarded to the IM proxy server 26. The IM proxy server 26 will process the message to form a text-based message ready for conversion to an audio format. The processed message is sent to the audio browser 28, which converts the message to an audio format and delivers it to the mobile terminal 20.

As such, the audio browser 28 provides text-to-speech and speech-to-text conversion to facilitate communications between the IM proxy server 26 and the mobile terminal 20. The IM proxy server 26 translates text messages to and from other text messages in a manner consistent with instant messaging. In addition to translating text, the IM proxy server 26 may recognize commands and implement the commands. Further detail is provided below.

Continuing with FIG. 1, a short message service (SMS) gateway 30 or like system may be used to send alerts, instructions, or the like to the mobile terminal 20 outside of the IM services. In addition to the SMS services, initiating a call, sending an email, and sending a page to user B may initiate alerts. These secondary messages may be used to simply alert the telephony user A that someone has come on line or that a message is available for delivery to the mobile terminal 20. The SMS gateway 30 or like service is intended as a secondary message delivery medium to facilitate use of the IM capability of the present invention.

The telephony user A may establish various profiles to guide and facilitate IM when using the mobile terminal 20. These profiles are preferably created and stored on a profile server 32 capable of communicating with the IM proxy server 26. Telephony user A may access the profile server 32 using a personal computer 34 or like computing device.

In general, the IM proxy server 26 and audio browser 28 preferably operate in a client-server configuration using an audio- or voice-capable markup language. The audio browser 28 will interpret the markup language content representing the audio message to send to the telephony user A and deliver the corresponding audio to the telephony user A. Audio from the telephony user A is likewise converted to content for delivery to the IM proxy server 26. The messages sent to the telephony user A from the audio browser 28 may be pre-recorded, may be generated in real-time based on text-to-speech conversion, or may be a combination thereof.

The voice extensible markup language (VoiceXML or VXML) is the preferred markup language for interaction between the audio browser 28 and the IM proxy server 26. VoiceXML is an XML document schema developed by the VoiceXML Forum, a group of organizations founded by AT&T, IBM, Lucent Technologies, and Motorola. VoiceXML facilitates web-generated interactions through audio, either pre-recorded or translated from text-to-speech, and through voice, using speech recognition. Additional information on VoiceXML may be obtained from Motorola, Inc., 1303 East Algonquin Road, Schaumburg, Ill., 60196, or from the VoiceXML,Forum, which has a web site at httip://www.voicexml.org.

The audio browser 28, which may be referred to as a voice browser, is analogous to traditional, graphical browsers using HTML. The World Wide Web Consortium (W3C) working draft for "An Introduction and Glossary for the Requirement Draft—Voice Browsers," 23 Dec. 1999, provides additional information on voice browsers, and is incorporated herein by reference in its entirety.

As such, the audio browser 28 is the liaison between the telephone network 14 and the IM proxy server 26 of the packet-switched network 12, and operates according to a call dialog established by the markup language. The call dialog is preferably provided to the audio browser 28 in a VoiceXML web page created by the IM proxy server 26. The call dialog will preferably include the necessary information to interact with the telephony user A, and optionally, establish calls to and originated by the telephony user A, as well as report the status of the call or the caller's response.

Preferably, the IM proxy server 26 will generate the necessary call dialog in a VoiceXML page and provide the page to the audio browser 28. The audio browser 28 will execute the call dialog to control communications with the telephony user A via the mobile terminal 20, as well as deliver audio to the mobile terminal 20 corresponding to the instant messages, deliver messages to the IM proxy server 26, and receive audio making up the message commands from the telephony user A. Preferably, the call dialog provided in the form of a VoiceXML page provides the audio browser 28 with sufficient instructions to carry out its translational duties and control communications with the mobile terminal 20 to facilitate instant messaging as described herein.

Thus, the audio browser 28 provides text converted from audio to the IM proxy server 26 in the form of requests for web pages, and the responding web pages may include the text to convert and send to the mobile terminal 20 in an audible format. The VoiceXML pages will also include sufficient instructions to have the audio browser 28 convert incoming audio and request subsequent pages to facilitate ongoing IM. The call dialog provided in the VoiceXML pages may facilitate numerous iterations, instructions, and commands to effectively control the audio browser 28 and the connection with the mobile terminal 20.

IM messages are typically short, abbreviated strings of text capable of conveying a certain meaning, and preferably associated with characteristics of the sender of the message. These characteristics often relate to the emotional state or personality of the sender, as well as any particular emphasis associated with a given message. Thus, an important aspect of IM is the ability to effectively communicate these characteristics. Unfortunately, existing speech recognition systems are not capable of conveying these characteristics. Further, speech recognition technology remains an imperfect technology, and has proven difficult to effectively translate real-time speech-to-text and vice versa. However, speech recognition technology is effective and reliable in recognizing pre-defined words and phrases permitting the formation of a limited vocabulary or language.

Figure 2A:
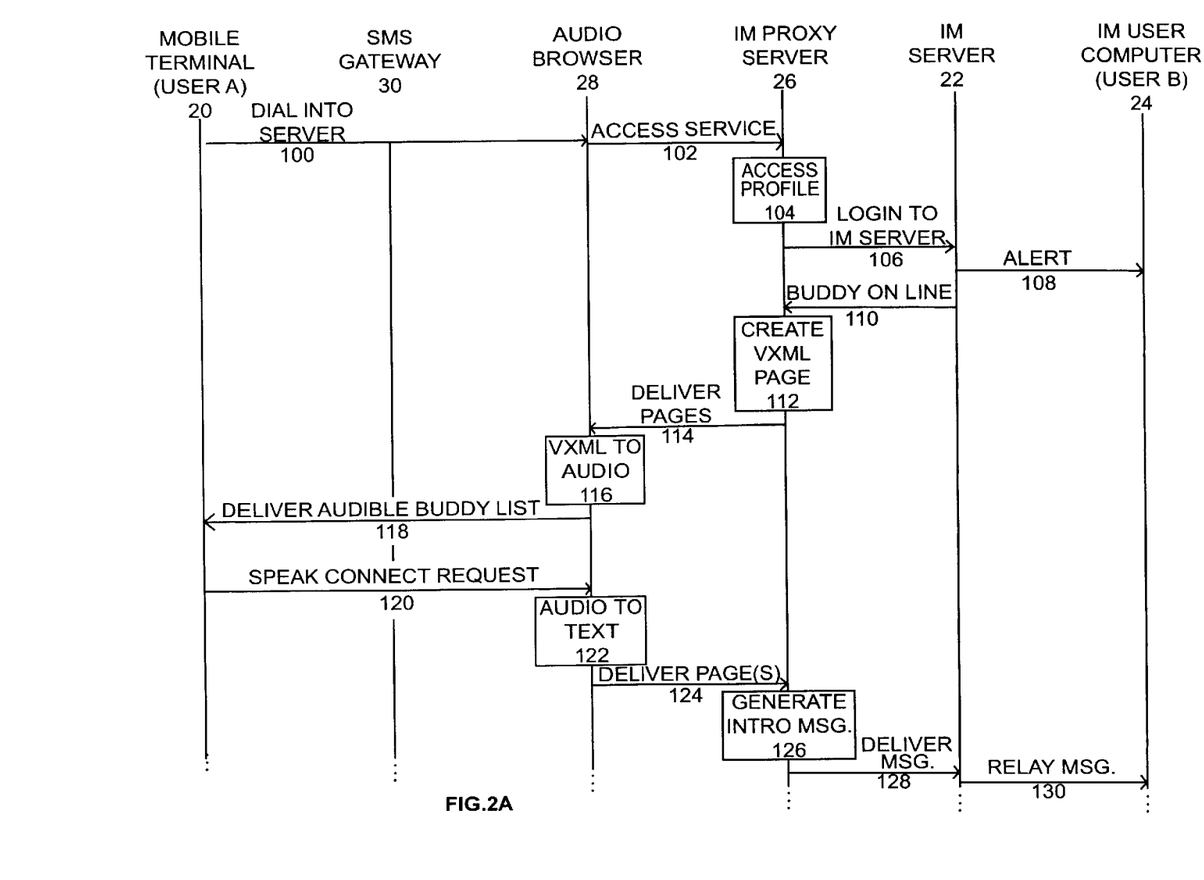
FIGS. 2A through 2C illustrate a communication flow diagram outlining an exemplary process according to a preferred embodiment of the present invention.
Figure 2B:
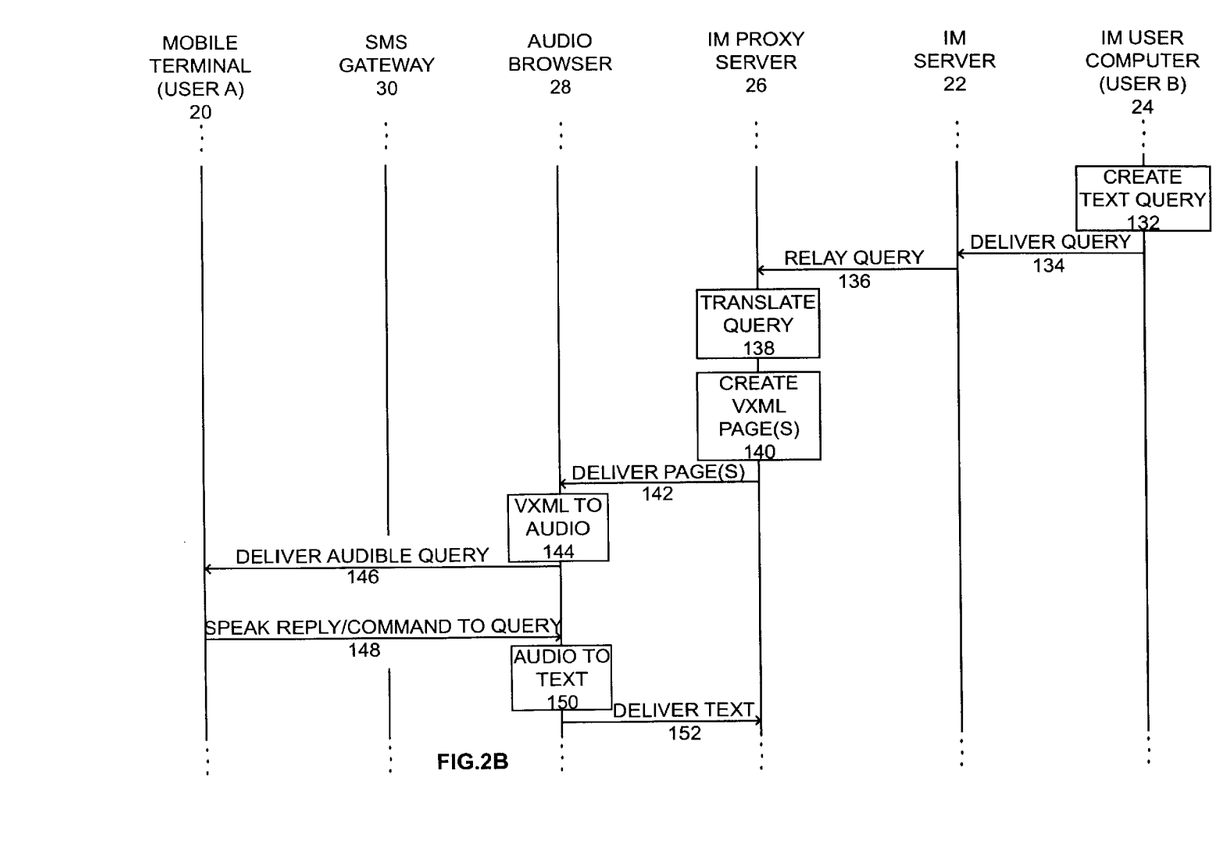
Figure 2C:
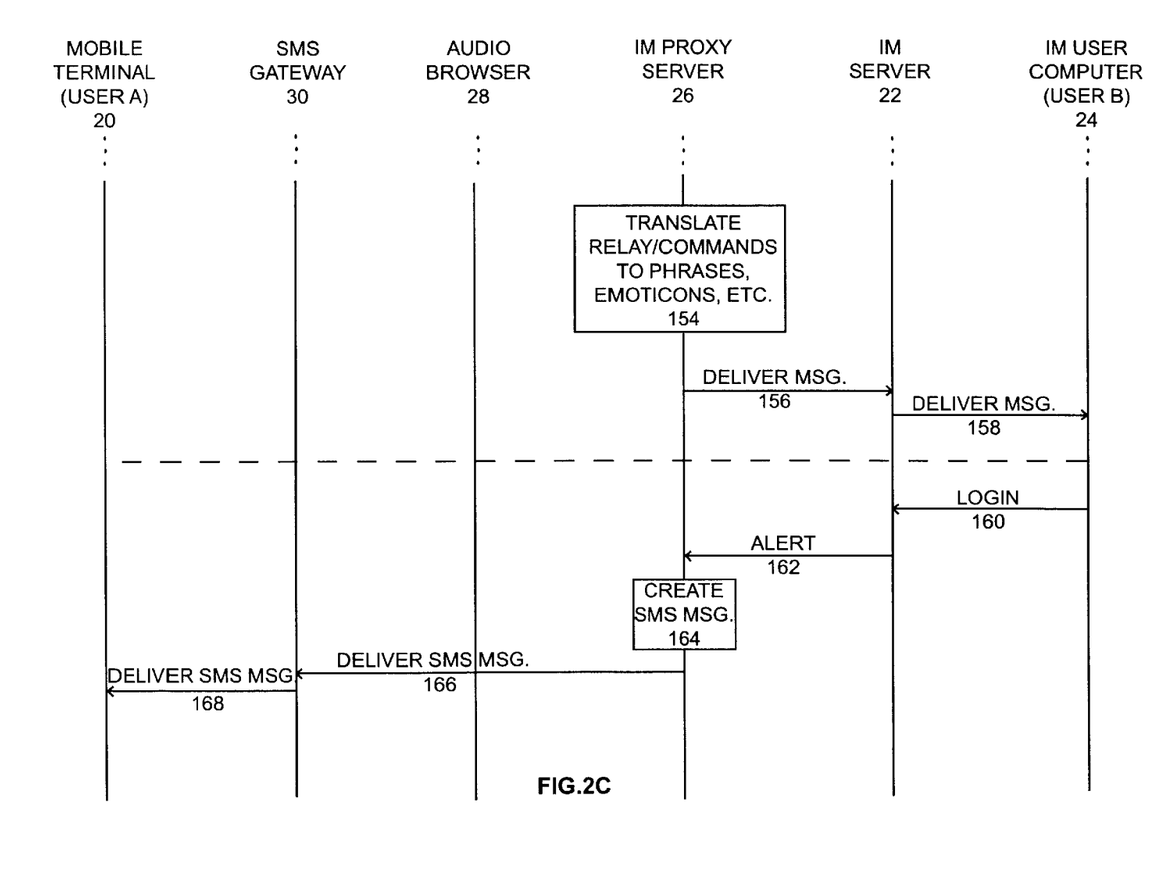

Operation of an exemplary embodiment of the present invention is illustrated in the communication flow diagram of FIGS. 2A through 2C. For this example, assume the user B logged into the IM service facilitated by the IM server 22. Further, assume that user A decided to join the IM service via mobile terminal 20 by dialing into the IM service through a designated number associated with a port on the audio browser 28 (step 100). The audio browser 28 will answer the incoming call, and based on the port, will access the IM service via the IM proxy server 26 (step 102). The IM proxy server 26 will identify the caller (user A) and access a user profile that includes all logins, passwords, and preferences for the IM service (step 104).

The IM proxy server 26 may identify a user by processing the caller identification information, which could be provided in-band or out-of-band as in the case of a primary rate interface (PRI). The user profile may be identified by the caller identification information stored in the IM proxy server 26 or remote server, such as the profile server 32 (as shown in FIG. 1). The user may directly access the profile server 32 and configure the associated profile directly by the computer 34.

The IM proxy server 26 will log into the IM service via the IM server 22 on behalf of user A and using the information obtained from user A's profile (step 106). Initially the IM server 22 sends an alert to all users that have user A on their buddy list that user A is logged into the IM session (step 108). Although the alert may take many forms, the alert may be preconfigured to announce that user A is on line and ready to participate. The IM server 22 will also respond to user A via the IM proxy server 26 to identify the buddies of user A who are on line and participating in the IM session (step 110).

In response, the IM proxy server 26 will create a VoiceXML (VXML) page or pages corresponding to the message from the IM server 22 (step 112) and deliver the page(s) to the audio browser 28 (step 114). The audio browser 28 will process the received page(s) to convert the enclosed textual message to an audio message (step 116) and deliver the audible message, which includes the buddy list, to user A via the mobile terminal 20 over the telephone network 14 (step 118).

In response to hearing the buddy list, user A will announce (SPEAK) a connect request (step 120), which is received by the audio browser 28. The audio browser 28 will convert the audible connect request to text in a VoiceXML page (step 122) and deliver the page to the IM proxy server 26 (step 124). In response, an introduction message is created by the IM proxy server 26 (step126) and delivered to the IM server (step 128). The introduction message may be any sort of message configured to initiate the IM session. The IM server 22 then relays the introduction message to user B via the IM user computer 24 (step 130). At this point, user A is ready to fully participate in the IM session with user B and any other participating users.

As noted, current voice recognition systems have difficulty recognizing different users and using open-ended grammars. For the present invention, a text-based user, such as user B, may define the grammar expected in response to textual queries (step 132) and send the text message with the query and answers to the IM server 22 (step 134), which will relay the query and answers to the IM proxy server 26 (step 136).

By defining a few selected responses, the voice recognition system implemented in the audio browser 28 is more likely to correctly recognize the response from user A than if the responses are not limited. Accordingly, in one embodiment of the present invention, the text-based user, user B, primarily controls the IM session. The control is asserted by providing choices to queries and using a question and answer format that allows the IM proxy server 26 to parse the query and each possible answer. For example, the text message from user B may be "User A, what would you like for dinner? Pizza? Spaghetti? Hamburgers?" wherein question marks are used to delineate the acceptable answers to the query.

The IM proxy'server 26 will translate the IM message to create a dynamic speech recognition grammar for the possible answers for the audio browser 28 (step 138). The text message and the grammar are used to create VoiceXML pages (step 140), which are delivered to the audio browser 28 (step 142). The audio browser 28 will process the VoiceXML pages to convert the text message, including the query and answers, to an audible query as well as use the grammar for the answers to recognize user A's response (step 144). The audible message, including the query and answers, is delivered to user A via the mobile terminal 20 (step 146).

User A will respond by speaking one of the possible answers to the query into the mobile terminal 20 (step 148). The-response is received and processed-by the audio browser 28using the defined grammar associated with the possible answers to generate text for the answer (step 150). The text is delivered to the IM proxy server 26 (step 152), which translates or otherwise creates an IM message for delivery to user B (step 154). If the reply is simply an answer to a given query, the IM message may simply be the text of the answer. The translation may change select words or phrases into numbers, acronyms, icons, or abbreviations, as is standard practice for IM. As described in greater detail below, user A may also provide messages, which may include commands to control the IM proxy server 26 or indicia related to the emotional or personal state of the user. After processing or translation, the message is delivered to the IM server 22 (step 156) and forwarded to user B via the IM user computer 24 (step 158). The process will repeat to facilitate a full dialogue between the participating users.

As illustrated in FIG. 2C, one of the numerous techniques to alert a mobile user that "buddies" are participating in an IM session is to have an alert sent to the user when a buddy, such as user B, logs into the IM service (step 160). In this example, an SMS message is sent to the mobile terminal 20 to alert user A that user B has logged into the IM service. In response, user A can either ignore the SMS message or login to the system as described above.

When user B logs into the IM server (step 160), the IM server 22 will send an alert to the IM proxy server 26 (step 162). In response, the IM proxy server 26 may create an SMS message (step 164) and send the message to the SMS gateway 30 (step 166), which will send the SMS message to the mobile terminal 20 (step 168). Alternatively, the IM proxy server 26 could initiate a telephone call to user A via the audio browser 28. Those skilled in the art will recognize the numerous techniques to invite a telephony user to join an IM session.

As noted above, various commands may be configured to facilitate various messages and features on behalf of telephony users. The commands may cause the IM proxy server 26 or other device to initiate an action or task. The commands may be separate from or intermingled with IM messaging. An exemplary IM session is provided in the communication flow of FIGS. 3A through 3D. Assume that user A desires to login into and participate in an IM session between user B and user C. The mobile terminal 20 may be configured to recognize basic speech commands. As such, user A may have mobile terminal 20 programmed to call the IM port of the audio browser 28 saying "instant messaging" and log into the IM session as described above (step 200).

Please note that FIGS. 3A through 3D provide a high level representation of the messaging between the users. Assume the audio browser 28 is providing speech-to-text and text-to-speech conversions for communications between the IM proxy server 26 and the mobile terminal 20. Further assume that the IM server 22 is facilitating the IM session between the IM user computer 24 of user B and the IM proxy server 26.

Figure 3A:
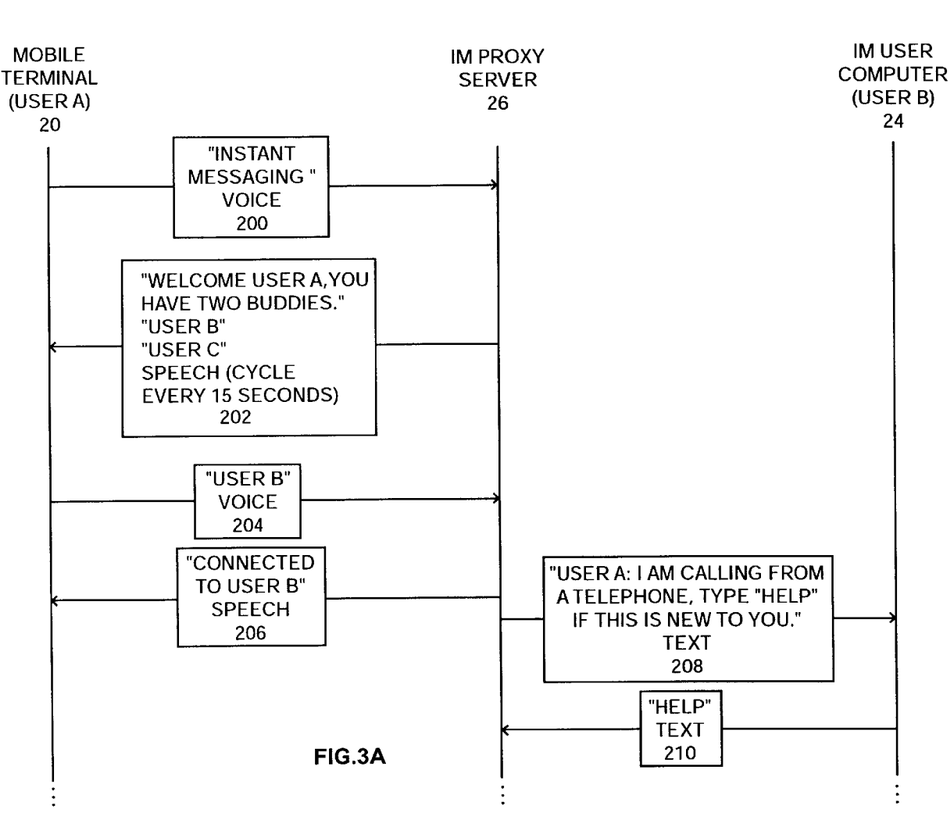
FIGS. 3A through 3D illustrate an exemplary IM session according to a preferred embodiment of the present invention.

In response to logging into the system, the IM proxy server 26 will alert user A that user B and user C are also logged in the IM service (step 202). The IM server 22 and IM proxy server 26 may cooperate to periodically poll participating users and alert user A when a new user logs into the session or a participating user logs out of the session. The alert will preferably coincide with grammar for the participating users to enable a user to speak the name of a user with whom to connect. Accordingly, user A may simply announce the user with whom to connect (step 204) and the IM proxy server 26 and the IM server 22 will cooperate to connect user A to user B and have the audio browser 28 announce that the user A is connected to the desired user B(step 206).

Figure 3B:
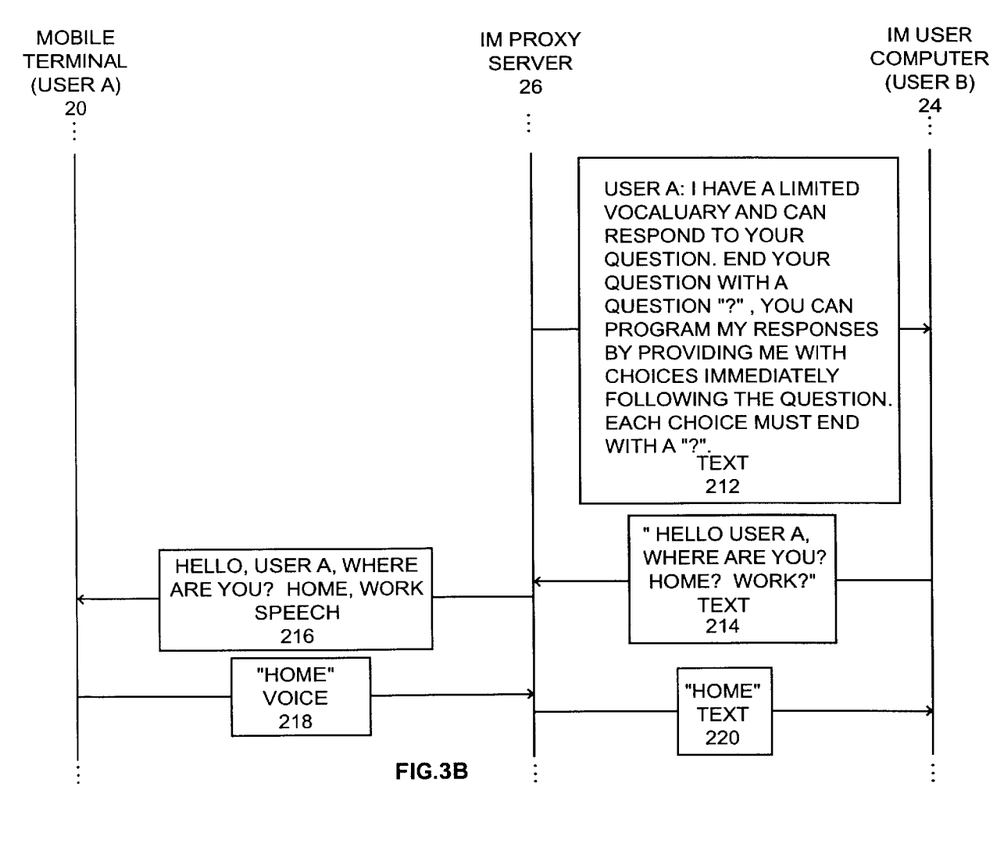
Figure 3C:
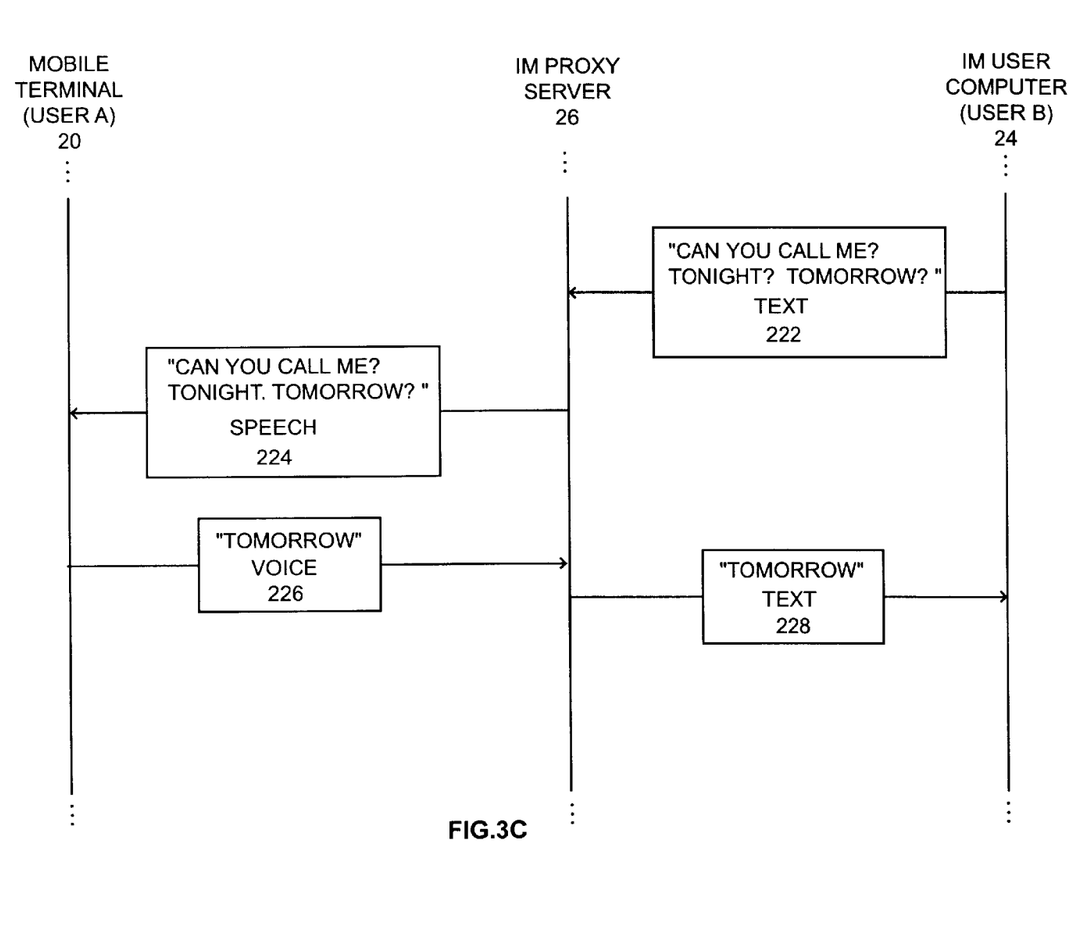

The IM proxy server 26 may also send a basic predetermined message, indicating user A is participating from a mobile terminal 20, to the connected user, user B (step 208). The message may define an action term, such as "help," that will initiate an action if user B responds with the term (step 210). In the present example, the action term "help" is configured to generate a predefined message to user B defining the special formatting and interaction guidelines of the embodiment of the present invention (step 212). Upon review, user B may send queries using the techniques of the present invention (step 214). The queries will be converted to audio and delivered to user A (step 216), who will respond with answers corresponding to the grammar defined for the particular query or queries (step 218). The audible answers are recognized and sent to the IM proxy server 26 to forward to user B in a text format via the IM server 22 (step 220). The process will repeat as desired (steps 222 through 246).

Since IM sessions often use acronyms, abbreviations, emoticons, and the like, the IM proxy server 26 is preferably configured to translate these short hand representations into corresponding words, phrases, or sounds as illustrated in the translation of the text message in step 230 to the speech of step 232. Similarly, the IM proxy server 26 can convert text from recognized speech and convert it into an appropriate short hand representation as illustrated in steps 234 and 236.

Figure 3D:
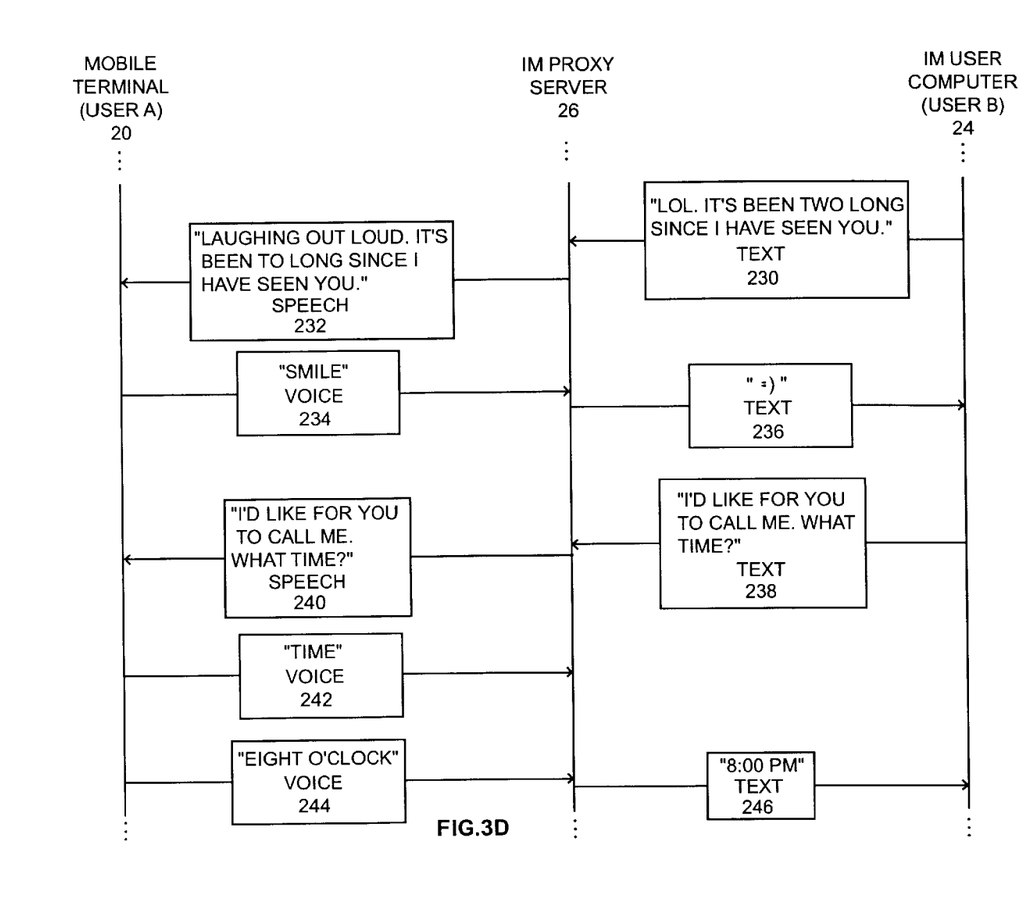

The IM proxy server 26 may also be configured to respond to commands by re-prompting the telephony user using a specialized grammar. For example, if user B sent the following message to user A, "I'd like for you to call me. What time?", the message would be converted to speech and sent to user A as illustrated in steps 238 and 240. In response, user A may initiate a grammar for announcing time by saying "time" as shown in step 242. The IM proxy server 26 will initialize the new grammar and re-prompt user A to state the time or simply wait for the time response from user A as shown in step 244. Once the time is provided by user A, the audio browser 28 will use the initialized grammar to recognize the voice response and provide the recognized text to the IM proxy server 26, which will send a corresponding IM message to user B as shown in step 246.

Figure 4:
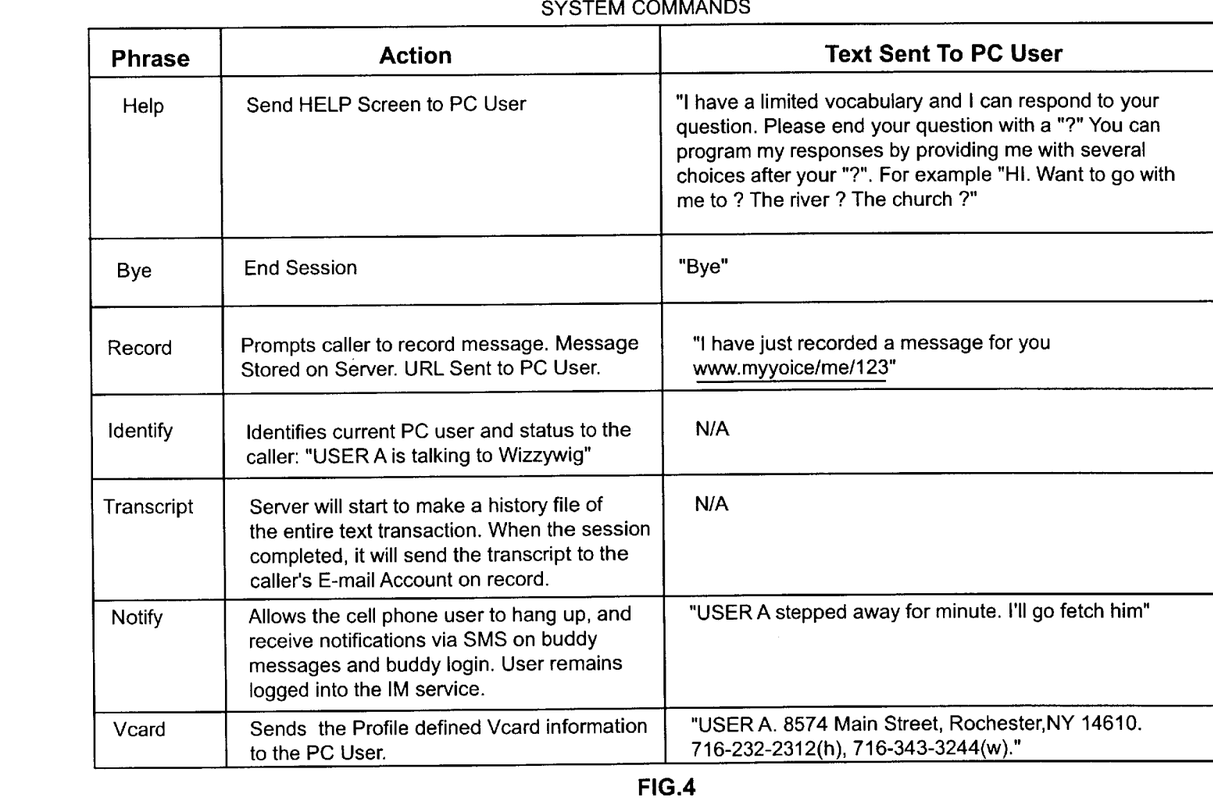
FIG. 4 is a table providing exemplary system commands according to a preferred embodiment of the present invention.
Figure 5:
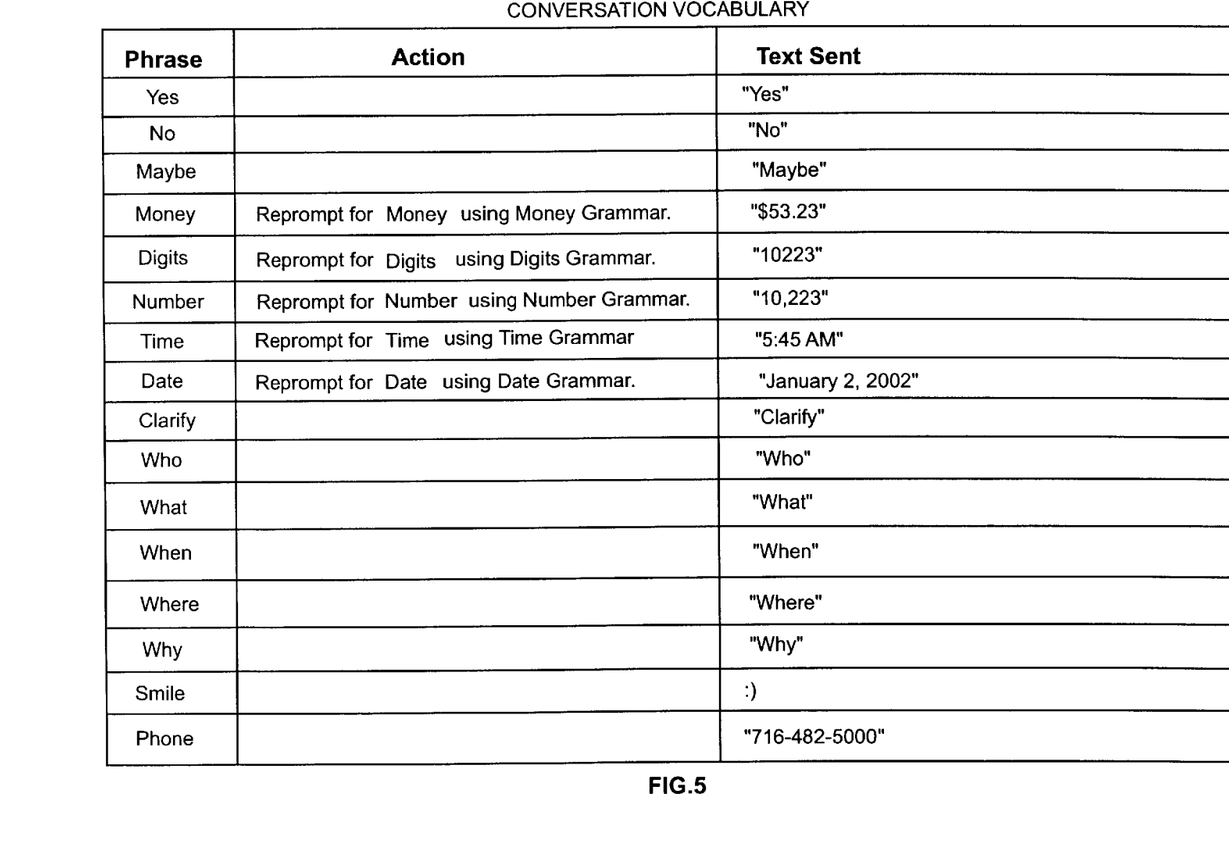
FIG. 5 is a table providing exemplary system commands according to a preferred embodiment of the present invention.

The table in FIG. 4 outlines several exemplary system commands that can be spoken by the telephony user, the corresponding action, and the text sent to the on line user. Similarly, FIG. 5 provides a table outlining part of a conversation grammar that includes phrases that are directly converted to text, initiate a secondary grammar and re-prompting, and require translation or refer to stored information. For additional information pertaining to instant messaging services, reference is made to U.S. patent application Ser. No. 09/897,239 entitled "INSTANT MESSAGING USING A WIRELESS INTERFACE," filed 7/02/2001, which is incorporated herein in its entirety.

Figure 6:
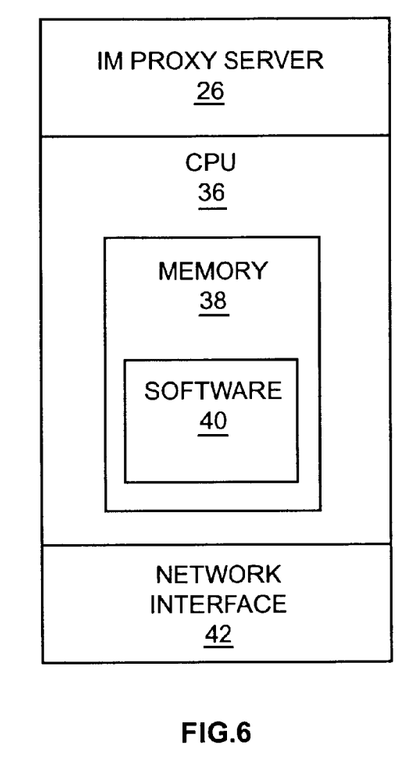
FIG. 6 is a block representation of an instant messaging proxy server constructed according to a preferred embodiment of the present invention.

An exemplary IM proxy server 26 is depicted in FIG. 6. The IM proxy server 26 will preferably include a central processing unit (CPU) 36 having sufficient memory 38 to store the necessary software 40 to operate and store associated data. The CPU 36 is associated with a network interface 42 to facilitate packet-switched communications via the packet-switched network 12.

Figure 7:
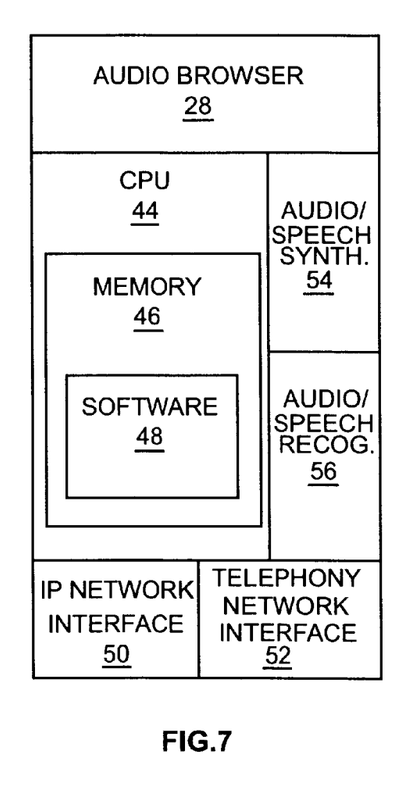
FIG. 7 is a block representation of an audio browser constructed according to a preferred embodiment of the present invention.

FIG. 7 is a block representation of an audio browser 28, which will typically include a CPU 44 associated with memory 46 and the requisite software 48 to control operation. The CPU 44 is also associated with an IP network interface 50 for communicating with network devices, such as the IM server 22, the profile server 32, and the IM proxy server 26. A telephone network interface 52 is provided for interaction with the telephone network 14, and in particular, a local exchange or mobile switching center 16, to facilitate circuit-switched communications over the telephone network 14. The telephone network interface 52 preferably supports a primary rate interface (PRI), T1, or like interface, to allow the audio browser 28 to directly communicate with telephony devices, such as the mobile terminal 20, via direct or wireless switching systems. Alternatively, various Voice Over IP (VoIP) interfaces may be used.

In order to recognize and inject audio, such as tones and speech, the audio browser 28 is preferably configured with an audio or speech synthesizer 54 and audio or speech recognition software/hardware 56. The speech synthesizer 54 is used to generate audio instructions and messages for the telephony user A. Notably, the audio browser 28 may use pre-recorded audio to provide messages to the called party based on instructions from the IM proxy server 26, or may convert textual content to speech. The speech recognition software/hardware 56 is configured to recognize speech of the telephony user A during a communication session, or to recognize tones, such as those generated from key presses of a telephony device, such as mobile terminal 20. As noted above, the audio browser 28 preferably uses VoiceXML as a liaison between audio or speech, both spoken and recognized, and the data representing the speech that is sent to and from the IM proxy server 26. The audio browser 28 may include server processes in addition to the normal client processes of a traditional browser to facilitate the IM function and communications with the telephony user A.

Notably, the above example provides a few select scenarios for initiating and facilitating instant messaging. Those skilled in the art will recognize that multiple users may participate, wherein messages are sent to multiple parties simultaneously. Although the audio browser 28 is set up as a client for the IM proxy server 26 in one embodiment, various protocols and communication techniques may be used to communicate information between the audio browser 28 and the IM proxy server 26. Further, the audio browser 28 may support any type of markup language capable of supporting voice interaction with telephone terminals and may be configured to generate various types of requests for content from the IM proxy server 26. Those skilled in the art will recognize that various types of executable content may be provided to run on the audio browser 28 or the IM proxy server 26 to facilitate updates and additional requests corresponding to alerts, messages, and the like.

Those skilled in the art will recognize improvements and modifications to the preferred embodiments of the present invention. All such improvements and modifications are considered within the scope of the concepts disclosed herein and the claims that follow.

What is claimed is:

1. A method for facilitating instant messaging (IM) for a telephony user comprising:
   a) receiving an IM message, which contains information and is directed to the telephony user, from a text-based IM user via an IM service;
   b) creating a speech recognition grammar based on the information in the IM message, wherein said speech recognition grammar constrains speech recognition of an audible response to a subset of a universe of potentially spoken words; and
   c) sending the speech recognition grammar to a speech recognition system to control speech recognition of the audible response from the telephony user.

2. The method of claim 1 wherein the information includes a plurality of defined responses to a query from a text-based IM user and the speech recognition grammar defines each of the plurality of defined responses.

3. The method of claim 2 wherein the information includes the query along with the plurality of defined responses.

4. The method of claim 3 wherein the query and the plurality of answers are delineated with at least one character and further comprising determining the plurality of responses based on the at least one character delineating the plurality of responses.

5. The method of claim 1 further comprising:
   a) receiving an audible response from the telephony user via the speech recognition system;
   b) creating an instant message based on the audible response; and
   c) sending the instant message to the text-based user via the instant message service.

6. The method of claim 1 further comprising:
   a) receiving a command from the telephony user via the speech recognition system;
   b) creating an instant message based on the command; and
   c) sending the instant message to the text-based user via the instant messaging service.

7. The method of claim 1 further comprising effecting conversion of at least part of the information in the IM message into an audible message and audibly delivering the audible message to the telephony user.

8. The method of claim 1 further comprising effecting delivery of an alert to the telephony user via at least one of the group consisting of initiating a call, sending an email, sending a message via a short message service, and sending a page to a telephony device of the telephony user.

9. The method of claim 1 further comprising:
   a) providing a predefined specialized speech recognition grammar to the speech recognition system; and
   b) responding to responses from the telephony user defined by the predefined specialized speech recognition grammar by delivering a predefined IM message to the text-based user.

10. The method of claim 1 further comprising;
   a) providing a predefined specialized speech recognition grammar to the speech recognition system; and
   b) responding to the responses from the telephony user defined by the predefined specialized speech recognition grammar by controlling the IM service.

11. A system for facilitating instant messaging for a telephony user comprising:
   a) a communication interface for communicating with an instant messaging (IM) service and an audio interface associated with a speech recognition function and capable of communicating with the telephony user; and
   b) a control system associated with the communication interface and adapted to:
      i) receive an IM message, which contains information and is directed to a telephony user, from a text-based IM user via the IM service;
      ii) create a speech recognition grammar based on the information in the IM message, wherein said speech recognition grammar constrains speech recognition of an audible response to a subset of a universe of potentially spoken words; and
      iii) send the speech recognition grammar to the audio interface to control speech recognition of an audible response form the telephony user.

12. The system of claim 11 wherein the information includes a plurality of defined responses to a query from a text-based IM user and the speech recognition grammar defines each of the plurality of defined responses.

13. The system of claim 12 wherein the information includes the query along with the plurality of defined responses.

14. The system of claim 13 wherein the query and the plurality of answers are delineated with at least one character and the control system is further adapted to determine the plurality of responses based on the at least one character delineating the plurality of responses.

15. The system of claim 11 wherein the control system is further adapted to:
 a) receive an audible response from the telephony user via the audio interface;
 b) create an instant message based on the audible response; and
 c) send the instant message to the text-based user via the instant messaging service.

16. The system of claim 11 wherein the control system is further adapted to:
 a) receive a command from the telephony user via the audio interface;
 b) create an instant message based on the command; and
 c) send the instant message to the text-based user via the instant messaging service.

17. The system of claim 11 further comprising an audio browser adapted to implement the audio interface and the speech recognition system wherein the audio browser is adapted to effect conversion of at least part of the information from the IM message into an audible message and deliver the audible message to the telephony user.

18. The system of claim 11 wherein the control system is further adapted to effect delivery of an alert to the telephony user via at least one of the group consisting of initiating a call, sending an email, sending a message via a short message service, and sending a page to a telephony device of the telephony user.

19. The system of claim 11 wherein the control system is further adapted to:
 a) provide a predefined specialized speech recognition grammar to the speech recognition system; and
 b) respond to responses from the telephony user defined by the predefined specialized speech recognition grammar by delivering a predefined IM message to the text-based user.

20. The system of claim 11 wherein the control system is further adapted to:
 a) provide a predefined specialized speech recognition grammar to the speech recognition system; and
 b) respond to responses from the telephony user defined by the predefined specialized speech recognition grammar by controlling the IM service.

21. A computer readable medium with software facilitating instant messaging for a telephony user and comprising instructions for a computer to:
 a) receive an IM message, which contain information and is directed to the telephony user, from a text-based IM user via an IM service;
 b) create a speech recognition grammar based on the information in the IM message, wherein said speech recognition grammar constrains speech recognition of an audible response to a subset of a universe of potentially spoken words; and
 c) send the speech recognition grammar to an audio interface to control speech recognition of an audible response from the telephony user.

22. The computer readable medium of claim 21 wherein the information includes a plurality of defined responses to a query from a text-based IM user and the speech recognition grammar defines each of the plurality of defied responses.

23. The computer readable medium of claim 22 wherein the information includes the query along with the plurality of defined responses.

24. The computer readable medium of claim 23 wherein the query and the plurality of answers are delineated with at least one character and comprises further instructions to determine the plurality of responses based on the at least one character delineating the plurality of responses.

25. The computer readable medium of claim 21 comprising further instructions to:
 a) receive an audible response from the telephony user via an audio interface;
 b) create an instant message based on the audible response; and
 c) send the instant message to the text-based user via the instant messaging service.

26. A method for facilitating instant messaging (IM) for a telephony user comprising:
 receiving an IM message, which contains information and is directed to the telephony user, from a text-based IM user via an IM service, said information containing a query and a number of predefined acceptable responses separated by predefined punctuation marks; creating a speech recognition grammar based on said information in the IM message;
 creating an audible message from the information, said audible message including the query and the number of predefined acceptable responses;
 sending the audible message to the telephony user; and sending the speech recognition grammar to a speech recognition system to control the predefined acceptable responses.

27. The method of claim 26 further comprising receiving an audible reply from the telephony user, said audible reply containing an audible version of one of the predefined acceptable responses.

28. The method of claim 26 wherein the predefined punctuation marks comprise question marks.

29. The method of claim 26 wherein receiving an IM message comprises receiving an IM message at an IM server.

* * * * *